(12) United States Patent
Chen

(10) Patent No.: US 10,956,473 B2
(45) Date of Patent: Mar. 23, 2021

(54) ARTICLE QUALITY SCORING METHOD AND DEVICE, CLIENT, SERVER, AND PROGRAMMABLE DEVICE

(71) Applicant: GUANGZHOU UCWEB COMPUTER TECHNOLOGY CO., LTD., Guangzhou (CN)

(72) Inventor: Huijuan Chen, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 156 days.

(21) Appl. No.: 15/708,434

(22) Filed: Sep. 19, 2017

(65) Prior Publication Data

US 2018/0081626 A1 Mar. 22, 2018

(30) Foreign Application Priority Data

Sep. 22, 2016 (CN) .......................... 201610844204.2

(51) Int. Cl.
*G06F 16/335* (2019.01)
*G06F 16/9535* (2019.01)
*H04L 29/08* (2006.01)

(52) U.S. Cl.
CPC ........ *G06F 16/335* (2019.01); *G06F 16/9535* (2019.01); *H04L 67/22* (2013.01)

(58) Field of Classification Search
CPC ............... G06F 16/9535; G06F 16/951; G06F 16/24578; G06F 16/334; G06F 16/248; G06F 16/3329; G06F 16/337; G06F 16/338; G06F 16/285; G06F 16/3349
USPC .......................... 707/748, 723, 722, 728, 749
See application file for complete search history.

(56) References Cited

U.S. PATENT DOCUMENTS

| | | | | |
|---|---|---|---|---|
| 6,078,916 A | * | 6/2000 | Culliss | G06F 16/338 |
| | | | | 707/E17.06 |
| 8,527,585 B2 | * | 9/2013 | Liang | H04L 67/42 |
| | | | | 709/203 |
| 8,572,011 B1 | * | 10/2013 | Sculley, II | G06N 20/00 |
| | | | | 706/13 |
| 8,954,420 B1 | * | 2/2015 | Khan | G06F 16/9535 |
| | | | | 707/722 |

(Continued)

FOREIGN PATENT DOCUMENTS

| CN | 104361063 A | 2/2015 |
|---|---|---|
| CN | 104834731 A | 8/2015 |

(Continued)

OTHER PUBLICATIONS

First Search dated Dec. 25, 2020, issued in related Chinese Application No. 201610844204.2 (1 page).

*Primary Examiner* — Dangelino N Gortayo
(74) *Attorney, Agent, or Firm* — Sheppard Mullin Richter & Hampton LLP

(57) ABSTRACT

The present application discloses an article quality scoring method and device, a client, a server, and a programmable device. The method includes: obtaining browsing behavior information of a user when the user browses a target article; obtaining a browsing behavior score of the user for the target article according to the browsing behavior information and a corresponding browsing behavior coefficient; and obtaining an article quality score of the target article according to obtained browsing behavior scores of multiple users for the target article.

18 Claims, 3 Drawing Sheets

(56) References Cited

U.S. PATENT DOCUMENTS

| | | | |
|---|---|---|---|
| 9,009,170 B1 | 4/2015 | Baluja et al. | |
| 9,223,897 B1 * | 12/2015 | Gross | G06F 16/838 |
| 10,891,252 B2 | 1/2021 | Zhong | |
| 2005/0149498 A1 * | 7/2005 | Lawrence | G06F 16/951 707/999.003 |
| 2007/0265994 A1 * | 11/2007 | Ueda | G06F 21/552 |
| 2009/0138472 A1 * | 5/2009 | MacLean | G06F 16/951 |
| 2009/0300547 A1 * | 12/2009 | Bates | G06F 16/954 715/825 |
| 2014/0229487 A1 * | 8/2014 | Mukund | G06Q 50/01 707/740 |
| 2015/0081688 A1 * | 3/2015 | Blass | G06F 16/951 707/725 |
| 2015/0356179 A1 * | 12/2015 | Zhukovskii | G06F 16/951 707/751 |
| 2016/0344828 A1 * | 11/2016 | Hausler | G06F 16/9535 |
| 2016/0357753 A1 * | 12/2016 | Beaver | G06F 16/24578 |
| 2017/0017971 A1 * | 1/2017 | Moreau | G06Q 30/0202 |
| 2017/0220578 A1 * | 8/2017 | Kazi | G06F 40/30 |

FOREIGN PATENT DOCUMENTS

| | | |
|---|---|---|
| CN | 104850642 A | 8/2015 |
| CN | 105243087 A | 1/2016 |
| CN | 105677845 A | 6/2016 |
| CN | 105740434 A | 7/2016 |

* cited by examiner

US 10,956,473 B2

ARTICLE QUALITY SCORING METHOD AND DEVICE, CLIENT, SERVER, AND PROGRAMMABLE DEVICE

CROSS-REFERENCE TO RELATED APPLICATION

This application is based on and claims priority to and benefits of Chinese Patent Application No. 201610844204.2, filed with the State Intellectual Property Office (SIPO) of the People's Republic of China on Sep. 22, 2016, the entire contents of which is incorporated herein by reference.

TECHNICAL FIELD

The present invention relates to the field of Internet information processing technologies, and in particular, to an automatic article quality scoring method and device, a client, a server, and a programmable device for performing the method.

RELATED ART

With development of Internet technologies, accessing the Internet by using clients such as a browser or an application program similar to a browser becomes an important means for people to obtain information in daily life. In particular, a user may browse website content such as an article, a picture, an audio, or a video by using an Internet website, and may also publish content made by the user on an Internet website. There is an explosive growth in amount of network information of the Internet. To enable a user to obtain high-quality information faster by using the Internet, a client having a function of accessing the Internet is provided, and quality of an article published on an Internet website is generally scored, so that the user can browse a high-quality article on the Internet more quickly.

However, currently, in most of article quality scoring methods, scoring is performed according to one of a click-through rate (CTR) of an article or an article length or a combination of the two. However, the following problems still exist: regarding scoring according to a CTR of an article, a relatively high CTR may be achieved because a title of the article is attractive, but actually content is irrelevant. In this situation, the score is relatively high, and the article is considered to be a high-quality article. Regarding scoring according to an article length, a short article of relatively high quality may have a relatively low score, and is considered to be a poor-quality article.

Therefore, improvements need to be made for the foregoing problems existing in the prior art.

SUMMARY

An objective of the present invention is to provide a new technical solution for scoring quality of an article. According to a first aspect of the present invention, an article quality scoring method is provided, including: obtaining browsing behavior information of a user when the user browses a target article, where the browsing behavior information includes at least one of a reading time index, a reading length index, or a reading experience index of browsing of the target article by the user; obtaining a browsing behavior score of the user for the target article according to the browsing behavior information and a corresponding browsing behavior coefficient; and obtaining an article quality score of the target article according to obtained browsing behavior scores of multiple users for the target article.

Optionally, the reading time index is a reading time of a unit article length when the user browses the target article; the reading length index is a ratio of an actual reading length to a total length of the target article when the user browses the target article; and the reading experience index is a positive feedback indication or a negative feedback indication given by the user when the user browses the target article.

Optionally, the browsing behavior information is one of the reading time index, the reading length index, or the reading experience index of browsing of the target article by the user; and the browsing behavior score of the target article is a product of the browsing behavior information and the corresponding browsing behavior coefficient.

Optionally, the browsing behavior information includes at least two of the reading time index, the reading length index, or the reading experience index of browsing of the target article by the user; the browsing behavior coefficient includes at least two of a reading time coefficient corresponding to the reading time index, a reading length coefficient corresponding to the reading length index, or a reading experience coefficient corresponding to the reading experience index; and the browsing behavior score of the target article is a sum of at least two of a product of the reading time index and the reading time coefficient, a product of the reading length index and the reading length coefficient, or a product of the reading experience index and the reading experience coefficient.

Optionally, the article quality score of the target article is an average value of the obtained browsing behavior scores of the multiple users for the target article.

According to a second aspect of the present invention, an article quality scoring device is provided, including: an information obtaining unit, configured to obtain browsing behavior information of a user when the user browses a target article, where the browsing behavior information includes at least one of a reading time index, a reading length index, or a reading experience index of browsing of the target article by the user; a behavior scoring unit, configured to obtain a browsing behavior score of the user for the target article according to the browsing behavior information and a corresponding browsing behavior coefficient; and a quality scoring unit, configured to obtain an article quality score of the target article according to obtained browsing behavior scores of multiple users for the target article.

Optionally, the reading time index is a reading time of a unit article length when the user browses the target article; the reading length index is a ratio of an actual reading length to a total length of the target article when the user browses the target article; and the reading experience index is a positive feedback indication or a negative feedback indication given by the user when the user browses the target article.

Optionally, the browsing behavior information is one of the reading time index, the reading length index, or the reading experience index of browsing of the target article by the user; and the browsing behavior score of the target article is a product of the browsing behavior information and the corresponding browsing behavior coefficient.

Optionally, the browsing behavior information includes at least two of the reading time index, the reading length index, or the reading experience index of browsing of the target article by the user; the browsing behavior coefficient includes at least two of a reading time coefficient corresponding to the reading time index, a reading length coefficient corresponding to the reading length index, or a reading experience coefficient corresponding to the reading experience index; and the browsing behavior score of the target article is a sum of at least two of a product of the reading time index and the reading time coefficient, a product of the reading length index and the reading length coefficient, or a product of the reading experience index and the reading experience coefficient.

Optionally, the article quality score of the target article is an average value of the obtained browsing behavior scores of the multiple users for the target article.

According to a third aspect of the present invention, a client is provided, including an apparatus configured to perform the step of obtaining browsing behavior information of a user when the user browses a target article in any article quality scoring method provided in the first aspect of the present invention.

Optionally, the client further includes: an apparatus configured to perform the step of obtaining a browsing behavior score of the user for the target article in any article quality scoring method provided in the first aspect of the present invention.

According to a fourth aspect of the present invention, a server is provided, including an apparatus configured to perform the step of obtaining an article quality score of the target article in any article quality scoring method provided in the first aspect of the present invention.

Optionally, the server further includes: an apparatus configured to perform the step of obtaining a browsing behavior score of the user for the target article in any article quality scoring method provided in the first aspect of the present invention.

According to a fifth aspect of the present invention, a programmable device is provided, including a memory and a processor, where the memory is configured to store an instruction, and the instruction is used to control the processor to perform an operation, so as to perform any article quality scoring method provided in the first aspect of the present invention.

According to a further aspect, the present disclosure provides a non-transitory computer-readable storage medium storing instructions that, when executed by a processor of a computer system, cause the computer system to perform a method comprising:

obtaining browsing behavior information of a user when the user browses a target article, wherein the browsing behavior information comprises at least one of a reading time index, a reading length index, or a reading experience index of browsing of the target article by the user; obtaining a browsing behavior score of the user for the target article according to the browsing behavior information and a corresponding browsing behavior coefficient; and obtaining an article quality score of the target article according to obtained browsing behavior scores of multiple users for the target article.

According to yet another aspect, the present disclosure provides a server including a processor and a memory. The memory stores instructions that, when executed by the processor, cause the server to perform: obtaining browsing behavior information of a user when the user browses a target article, wherein the browsing behavior information comprises at least one of a reading time index, a reading length index, or a reading experience index of browsing of the target article by the user; obtaining a browsing behavior score of the user for the target article according to the browsing behavior information and a corresponding browsing behavior coefficient; and obtaining an article quality score of the target article according to obtained browsing behavior scores of multiple users for the target article.

The inventor of the present invention finds that in the prior art, a technical solution for scoring quality of an article according to a browsing behavior of browsing the article by the user, so as to providing a score based on actual browsing experience of the user is not provided. Therefore, the technical task to be achieved or the technical problem to be resolved by the present invention is never considered or expected by a person skilled in the art. Therefore, the present invention is a new technical solution.

The exemplary embodiments of the present invention are described in detail below with reference to the accompanying drawings, so that other features and advantages of the present invention become clear.

BRIEF DESCRIPTION OF THE DRAWINGS

The accompanying drawings, which are incorporated in and constitute a part of the specification, show embodiments of the present invention, and are used to explain the principles of the present invention together with the description.

DETAILED DESCRIPTION

Figure 1:
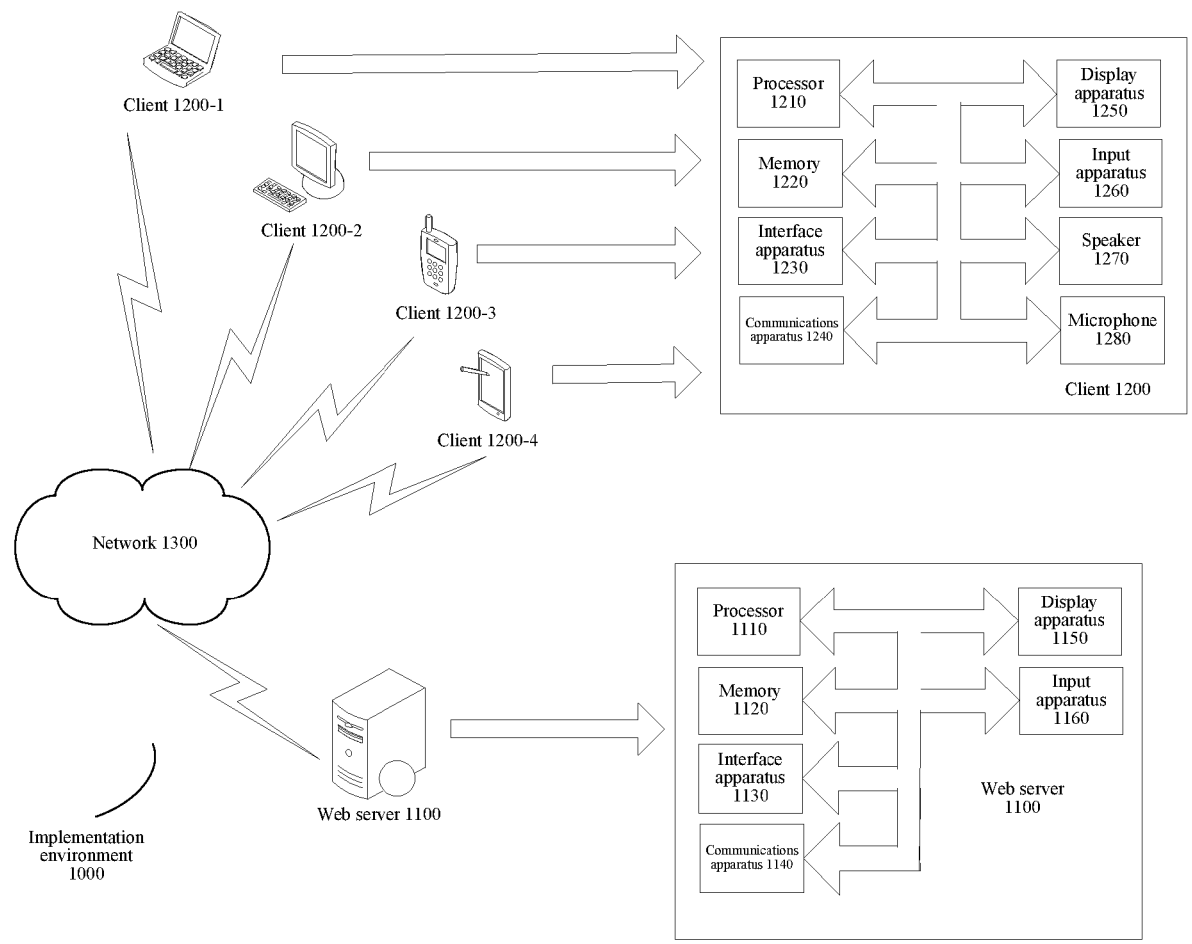
FIG. 1 shows a block diagram of an example of a hardware configuration of a computer system that may be configured to implement the embodiments of the present invention.

The present disclosure provides a technical solution for rating or scoring contents online. In particular, the present disclosure provides specific rules for automatically rating or scoring content online. By implementing the disclosed specific rules, the disclosure makes it possible to automatically rating content online, and thus improves functionalities of general computers and servers.

The exemplary embodiments of the present invention are described in detail with reference to the accompanying drawings. It should be noted that unless otherwise specified, relative layouts, mathematical expressions, and numeric values of components and steps described in these embodiments do not limit the scope of the present invention.

The following description about at least one exemplary embodiment is only illustrative, and should not constitute any limitation on the present invention and application or use of the present invention.

Technologies, methods, and devices that are known by a person of ordinary skill in related fields may not be discussed in detail. However, in proper cases, the technologies, the methods, and the devices should be considered as a part of the specification.

In all examples shown and discussed herein, any specific value should be explained as for illustration purposes only rather than as a limitation. Therefore, other examples of the exemplary embodiments may have different values.

It should be noted that similar reference numerals and letters represent similar items in the following accompanying drawings. Therefore, once an item is defined in a figure, the item does not need to be further discussed in subsequent figures.

FIG. 1 shows a block diagram of a hardware configuration of a computer system 1000 that may be used to implement the embodiments of the present invention. As shown in FIG. 1, an implementation environment 1000 includes a web server 1100, a client 1200, and a network 1300.

The web server 1100 may be, for example, a blade server. In an example, the server 1100 may be a computer. In another example, the server 1100 may include a processor 1110, a memory 1120, an interface apparatus 1130, a communication apparatus 1140, a display apparatus 1150, and an input apparatus 1160, as shown in FIG. 1. The server may also include a speaker and a microphone. These components are omitted herein. The processor 1110 may be, for example, a central processing unit (CPU) or a microprocessor (MCU). The memory 1120 includes, for example, a read-only memory (ROM), a random access memory (RAM), and a non-volatile memory such as a hard disk. The interface apparatus 1130 includes, for example, a USB interface and a serial interface. The communication apparatus 1140 can, for example, perform wired or wireless communication. The display apparatus 1150 is, for example, a liquid crystal display. The input apparatus 1160 may include, for example, a touchscreen and a keyboard.

The client device 1200 may be a portable computer (1200-1), a desktop computer (1200-2), a mobile phone (1200-3), or a tablet computer (1200-4). As shown in FIG. 1, the client 1200 may include a processor 1210, a memory 1220, an interface apparatus 1230, a communication apparatus 1240, a display apparatus 1250, an input apparatus 1260, a speaker 1270, and a microphone 1280. The processor 1210 may be a CPU or an MCU. The memory 1220 includes, for example, a ROM, a RAM, and a non-volatile memory such as a hard disk. The interface apparatus 1230 includes, for example, a USB interface and an earphone interface. The communication apparatus 1240 can, for example, perform wired or wireless communication. The display apparatus 1250 is, for example, a liquid crystal display or a touch display screen. The input apparatus 1260 may include, for example, a touchscreen and a keyboard. A user may input/output voice information by using the speaker 1270 and the microphone 1280.

A communication network 1300 may be a wireless network, a wired network, a local area network (LAN), or a wide area network (WAN). In the configuration environment 1000 shown in FIG. 1, the clients 1200-1, 1200-2, 1200-3, and 1200-4 may communicate with the web server 1100 by using the communication network 1300.

The configuration environment 1100 shown in FIG. 1 is only for explanatory purposes, and is not intended to limit the present invention and application or use of the present invention. In the embodiments applied to the present invention, the memory 1120 of the web server 1100 is configured to store an instruction, where the instruction is used to control the processor 1110 to perform an operation, so as to perform article quality scoring methods provided in the embodiments of the present invention. In addition, the memory 1220 of the client 1200 is configured to store an instruction, where the instruction is used to control the processor 1210 to perform an operation, so as to perform article quality scoring methods provided in the embodiments of the present invention. A person skilled in the art should understand that although multiple apparatuses are shown for the web server 1100 and the client 1200 in FIG. 1, the present invention may relate to only some of the apparatuses. For example, the web server 1100 only relates to the processor 1110 and the memory 1120, or the client 1200 only relates to the processor 1210 and the memory 1220. A person skilled in the art may design the instruction according to the solution disclosed in the present invention. How the instruction controls the processor to perform an operation is generally known in the art. Therefore, details are not provided herein again.

First Embodiment

Figure 2:
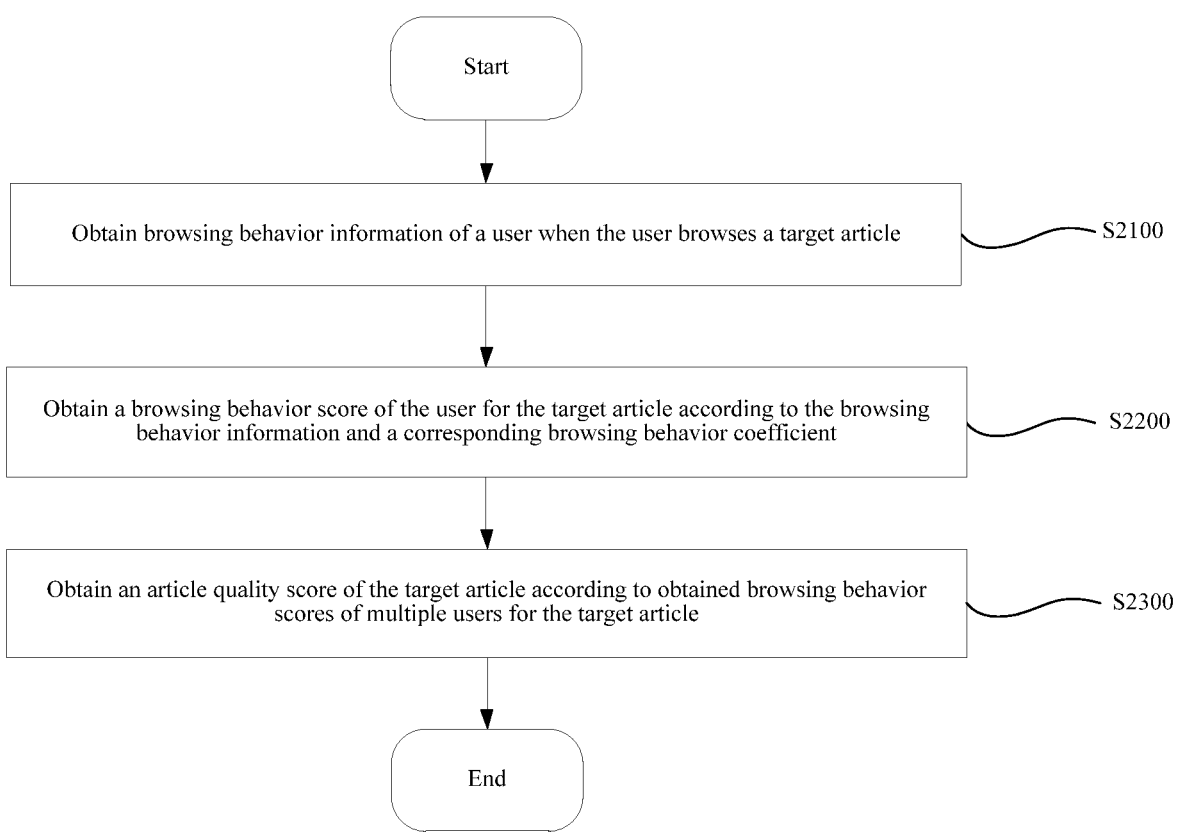
FIG. 2 shows a flowchart of an article quality scoring method according to a first embodiment of the present invention.

The first embodiment of the present invention provides an article quality scoring method, as shown in FIG. 2, including:

Step S2100: Obtain browsing behavior information of a user when the user browses a target article, where the browsing behavior information includes at least one of a reading time index, a reading length index, or a reading experience index of browsing of the target article by the user.

In this embodiment, the target article includes text content such as web news, web novels, online popular prose, blog articles, and space logs that may be browsed by the user by accessing an Internet website.

Moreover, the browsing behavior information is information about a reading behavior involved in browsing of the target article by the user, and the browsing behavior information may reflect quality of the target article. The browsing behavior information includes at least one of the reading time index, the reading length index, or the reading experience index of browsing of the target article by the user.

The reading time index is an index reflecting the quality of the target article by means of a reading time of browsing the target article by the user. A higher reading time index indicates a higher probability that the quality of the target article is excellent. Specifically, the reading time index may be a reading time of a unit article length when the user browses the target article, where the unit article length may be a preset default length, for example, the unit article length is a single byte. The reading time index may further be an article length read in a unit reading time when the user browses the target article.

The reading length index is an index reflecting the quality of the target article by means of an article length actually read when the user browses the target article. A higher reading length index indicates a higher probability that the quality of the target article is excellent. Specifically, the reading length index may be a ratio of an actual reading length to a total length of the target article when the user browses the target article.

The reading experience index is an index reflecting the quality of the target article by means of actual reading experience when the user browses the target article. A higher reading experience index indicates a higher probability that the quality of the target article is excellent. Specifically, the reading experience index is a positive feedback indication or a negative feedback indication given by the user when the user browses the target article. More specifically, the positive feedback indication may be likes or a rating higher than 60% of star ratings (for example, there are five stars in total for rating, and the user rating is a rating higher than three stars) in interface operations provided by the user on a corresponding website page when the user browses the target article, or may be a score higher than 60% of a total score in manual scoring. Correspondingly, the negative feedback indication may be a negative comment or a rating lower than 60% of star ratings (for example, there are five stars in total for rating, and a user rating is a rating of two stars or less) in interface operations provided by the user on a corresponding website page when the user browses the target article, or may be a score lower than 60% of a total score in manually input scores. In this embodiment, the negative feedback indication is a negative number less than 0, for example, −1; and the positive feedback indication is a positive number greater than 0, for example, 1.

The browsing behavior information may be obtained by a client, such as a browser or an application program having a function similar to that of the browser, providing a function for the user to access the Internet. Specifically, when the user browses the target article, the client may detect and record the reading time that the user takes to browse the target article, and the actual reading length, and obtain a feedback indication input by the user by operating a web page. A reading time of the unit article length that is obtained by dividing the reading time by the actual reading length may be used as the reading time index; a ratio that is obtained by dividing the actual reading length by the total length of the target article may be used as the reading length index; and the feedback indication may be used as the reading experience index.

After the browsing behavior information is obtained in step S2100, step S2200 is performed: Obtain a browsing behavior score of the user for the target article according to the browsing behavior information and a corresponding browsing behavior coefficient.

In this embodiment, the browsing behavior coefficient corresponds to the browsing behavior information, may be a preset empiric value or an experimental data value, and may also be changed or configured according to specific application scenarios. The browsing behavior score of the user for the target article may be obtained by the client (such as a browser or an application program having a function similar to that of the browser) providing a function for the user to access the Internet or a server connected to the client.

Specifically, the browsing behavior information may be one of the reading time index, the reading length index, or the reading experience index of browsing of the target article by the user; and the browsing behavior score of the target article is a product of the browsing behavior information and the corresponding browsing behavior coefficient.

For example, the browsing behavior information is the reading time index. That the reading time index is the reading time of the unit article length when the user browses the target article is used as a further example. Assuming that the reading time index is 0.01 second/byte and the reading time coefficient is 1000, the browsing behavior score of the target article is a product of the reading time index and the corresponding reading time coefficient, that is, 0.01*1000=10. For another example, the browsing behavior information is the reading length index. That the reading length index is the ratio of the actual reading length to the total length of the target article when the user browses the target article is used as a further example. Assuming that the reading length index is 0.2 and the reading length coefficient is 100, the browsing behavior score of the target article is a product of the reading time index and the corresponding reading length coefficient, that is, 0.2*100=20. Alternatively, the browsing behavior information is the reading experience index. That the reading experience index is the positive feedback indication or the negative feedback indication given by the user when the user browses the target article is used as a further example. Assuming that the user gives the negative feedback indication such as −1, and the reading experience coefficient is 50, the browsing behavior score of the target article is a product of the reading experience index and the corresponding reading experience coefficient, that is, −1*50=−50.

Alternatively, the browsing behavior information may include at least two of the reading time index, the reading length index, or the reading experience index of browsing of the target article by the user; the browsing behavior coefficient includes at least two of a reading time coefficient corresponding to the reading time index, a reading length coefficient corresponding to the reading length index, or a reading experience coefficient corresponding to the reading experience index; and the browsing behavior score of the target article is a sum of at least two of a product of the reading time index and the reading time coefficient, a product of the reading length index and the reading length coefficient, or a product of the reading experience index and the reading experience coefficient.

For example, the browsing behavior information is the reading time index and the reading length index, the corresponding browsing behavior coefficient includes the reading time coefficient corresponding to the reading time index and the reading length coefficient corresponding to the reading length index. Assuming that the reading time index is 0.01 second/byte, the reading length index is 0.2, the reading time coefficient is 1000, and the reading length coefficient is 100, the browsing behavior score of the target article is a sum of the product of the reading time index and the reading time coefficient and the product of the reading length index and the reading length coefficient, that is, 0.01*1000+ 0.2*100=30.

After the browsing behavior score of the user for the target article is obtained in step S2200, step S2300 is performed: Obtaining an article quality score of the target article according to obtained browsing behavior scores of multiple users for the target article.

In this embodiment, the article quality score of the target article may be obtained by a server connected to multiple clients (such as browsers or application programs having a function similar to that of the browsers) providing a function for the user to access the Internet. Specifically, the article quality score of the target article is an average value of the obtained browsing behavior scores of the multiple users for the target article.

Example

Figure 3:
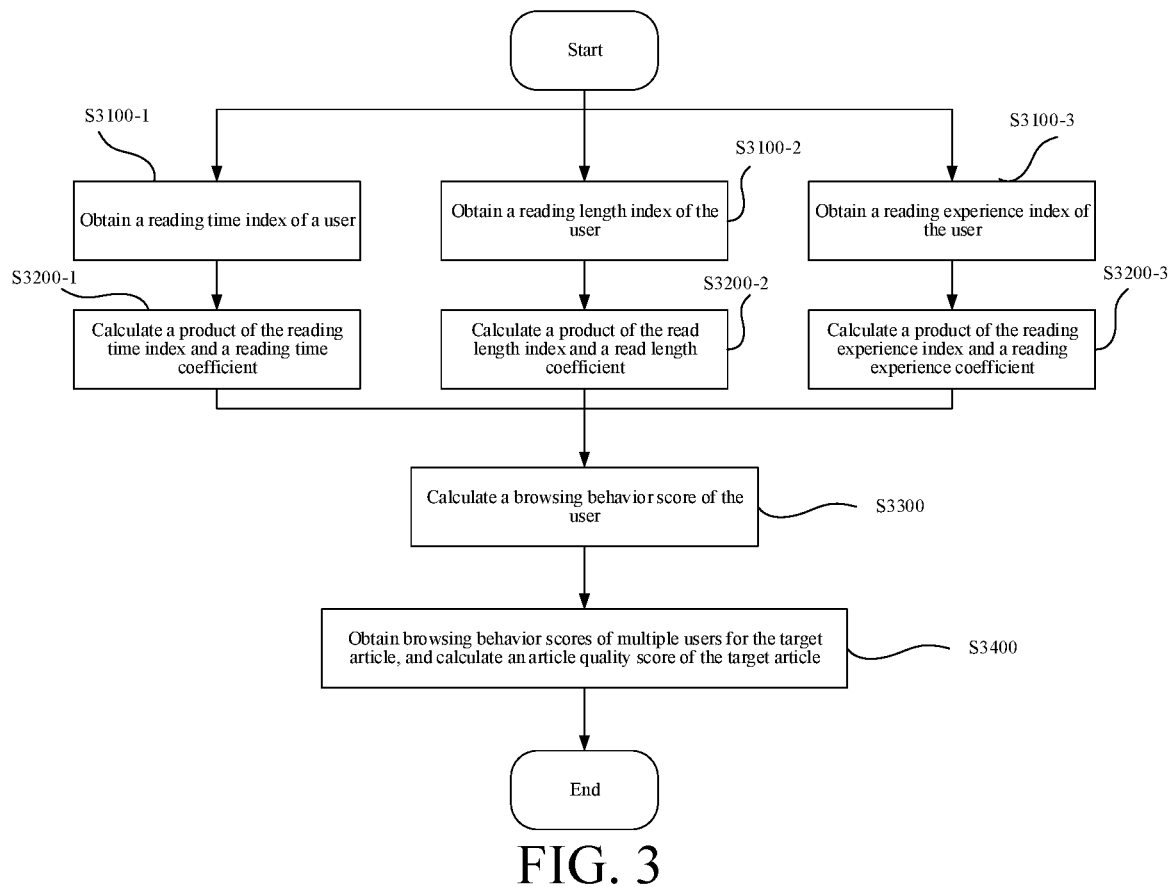
FIG. 3 shows a flowchart of an example of the article quality scoring method according to the first embodiment of the present invention.

The article quality scoring method provided in this embodiment is further described by using examples with reference to FIG. 3. In this example, the browsing behavior information includes the reading time index, the reading length index, and the reading experience index of browsing of the target article by the user. The reading time index is the reading time of the unit article length when the user browses the target article; the reading length index is the ratio of the actual reading length to the total length of the target article when the user browses the target article; and the reading experience index is the positive feedback indication or the negative feedback indication given by the user when the user browses the target article.

As shown in FIG. 3, the article quality scoring method in this example includes:

Step S3100-1: Obtain a reading time index of a user: a reading time of a unit article length when the user browses a target article. For example, if a reading time for the user to browse 1000 bytes is 10 seconds, the reading time index of the user is 10/1000=0.01 second/byte, and then step S3200-1 is performed.

Step S3100-2: Obtain a reading length index of the user: a ratio of an actual reading length to a total length of the target article when the user browses the target article. For example, if the length of the entire article is 5000 bytes, and the user reads 1000 bytes, the reading length index of the user is 1000/5000=0.02, and then step S3200-2 is performed.

Step S3100-3: Obtain a reading experience index of the user: a positive feedback indication or a negative feedback indication given by the user when the user browses the target article. For example, the user gives a negative feedback indication being −1 when the user browses the target article, and then step S3200-3 is performed.

Step S3200-1: Calculate a product of the reading time index and a reading time coefficient. For example, if the reading time coefficient is set to 1000, the product is calculated as 0.01*1000=10, and step S3300 is performed.

Step S3200-2: Calculate a product of the reading length index and a reading length coefficient. For example, if the reading length coefficient is set to 100, the product is calculated as 0.2*100=20, and step S3300 is performed.

Step S3300-3: Calculate a product of the reading experience index and a reading experience coefficient. For example, if the reading experience coefficient is set to 100, the product is calculated as −1*50=−50, and step S3300 is performed.

Step S3400: Calculate a browsing behavior score of the user: a sum of the product of the reading time index and the reading time coefficient, the product of the reading length index and the reading length coefficient, and the product of the reading experience index and the reading experience coefficient, that is, 10+20+(−50)=−20 scores.

Step S3500: Obtain, according to step S3100 to step S3400, browsing behavior scores of multiple users for the target article, and obtain an article quality score of the target article by calculating an average value. For example, if a sum of browsing behavior scores of 100 users is −1500 scores, the article quality score of the target article is −1500/100=−150 scores.

The first embodiment of the present invention is described above with reference to FIG. 2 and examples. According to this embodiment, browsing behavior information that can reflect quality of a target article browsed by a user when the user browses the target article is obtained, a browsing behavior score of the user for the target article is obtained according to the browsing behavior information and a corresponding browsing behavior coefficient, and then an article quality score of the target article is obtained according to obtained browsing behavior scores of multiple users for the target article, so that it can based on actual experience of the user when the user browses the target article to score the quality of the target article, so as to avoid erroneous scoring, existing in the prior art, of scoring quality of an article according to a CTR or an article length. Therefore, an assessment of the quality of the article is more precise, and user experience is improved.

Second Embodiment

Figure 4:
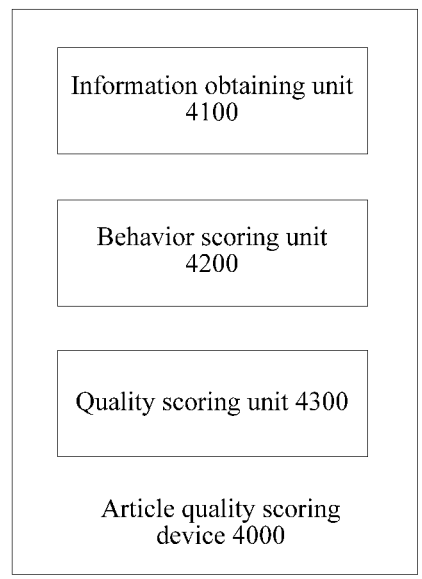
FIG. 4 shows a schematic block diagram of an article quality scoring device according to a second embodiment of the present invention.

The second embodiment of the present invention provides an article quality scoring device 4000, as shown in FIG. 4, including: an information obtaining unit 4100, a behavior scoring unit 4200, and a quality scoring unit 4300, and configured to implement any article quality scoring method provided in the first embodiment. Details are not provided herein again.

The article quality scoring device 4000 includes:

the information obtaining unit 4100, configured to obtain browsing behavior information of a user when the user browses a target article, where the browsing behavior information includes at least one of a reading time index, a reading length index, or a reading experience index of browsing of the target article by the user;

the behavior scoring unit 4200, configured to obtain a browsing behavior score of the user for the target article according to the browsing behavior information and a corresponding browsing behavior coefficient; and the quality scoring unit 4300, configured to obtain an article quality score of the target article according to obtained browsing behavior scores of multiple users for the target article.

Optionally, the reading time index is a reading time of a unit article length when the user browses the target article; the reading length index is a ratio of an actual reading length to a total length of the target article when the user browses the target article; and the reading experience index is a positive feedback indication or a negative feedback indication given by the user when the user browses the target article.

Optionally, the browsing behavior information is one of the reading time index, the reading length index, or the reading experience index of browsing of the target article by the user; and the browsing behavior score of the target article is a product of the browsing behavior information and the corresponding browsing behavior coefficient.

Optionally, the browsing behavior information includes at least two of the reading time index, the reading length index, or the reading experience index of browsing of the target article by the user; the browsing behavior coefficient includes at least two of a reading time coefficient corresponding to the reading time index, a reading length coefficient corresponding to the reading length index, or a reading experience coefficient corresponding to the reading experience index; and the browsing behavior score of the target article is a sum of at least two of a product of the reading time index and the reading time coefficient, a product of the reading length index and the reading length coefficient, or a product of the reading experience index and the reading experience coefficient.

Optionally, the article quality score of the target article is an average value of the obtained browsing behavior scores of the multiple users for the target article.

In this embodiment, a client is further provided, including: an apparatus configured to perform the step of obtaining browsing behavior information of a user when the user browses a target article in any article quality scoring method provided in the first embodiment. For example, the client includes the information obtaining unit 4100 in the article quality scoring device 4000.

Optionally, the client further includes: an apparatus configured to perform the step of obtaining a browsing behavior score of the user for the target article in any article quality scoring method provided in the first embodiment. For example, the client further includes the behavior scoring unit 4200 in the article quality scoring device 4000.

In this embodiment, the client may be a browser that can provide a function for accessing the Internet or an application program having a function similar to that of the browser. A schematic block diagram of a physical device form of the client may be shown by the client 1200 in FIG. 1, and details are not provided herein again.

This embodiment further provides a client, including: an apparatus configured to perform the step of obtaining an article quality score of the target article in any article quality scoring method provided in the first embodiment. For example, the server includes the quality scoring unit 4300 in the article quality scoring device 4000.

Optionally, the server further includes: an apparatus configured to perform the step of obtaining a browsing behavior score of the user for the target article in any article quality scoring method provided in the first embodiment. For example, the server further includes the behavior scoring unit 4200 in the article quality scoring device 4000.

In this embodiment, the server is a device connected to the client provided in this embodiment by means of wireless or wired communication. A schematic block diagram of a physical device form of the server may be shown by the server 1100 in FIG. 1, and details are not provided herein again.

This embodiment further provides a programmable device, including a memory and a processor, where the memory is configured to store an instruction, and the instruction is used to control the processor to perform an operation, so as to perform any article quality scoring method in the first embodiment. For example, a physical device form of the programmable device may include the server 1100 and the client 1200 shown in FIG. 1. The schematic block diagram is described above, and details are not provided herein again.

The second embodiment of the present invention is described above with reference to the accompanying drawings. According to this embodiment, an article quality scoring device, a client, a server, and an electronic device are provided, which may be configured to obtain browsing behavior information that can reflect quality of a target article browsed by a user when the user browses the target article, obtain a browsing behavior score of the user for the target article according to the browsing behavior information and a corresponding browsing behavior coefficient, and then obtain an article quality score of the target article according to obtained browsing behavior scores of multiple users for the target article, so that it can base on actual experience of the user when the user browses the target article to score the quality of the target article, so as to avoid erroneous scoring, existing in the prior art, of scoring quality of an article according to a CTR or an article length. Therefore, an assessment of the quality of the article is more precise, and user experience is improved.

A person skilled in the art should understand that the article quality scoring device 4000 may be implemented in various manners. For example, the article quality scoring device 4000 may be implemented by configuring the processor by using an instruction. For example, the instruction may be stored in a ROM. Moreover, when the device is started, the article quality scoring device 4000 is implemented by reading the instruction from the ROM into a programmable device. For example, the article quality scoring device 4000 may be solidified into a dedicated device (such as an ASIC). The article quality scoring device 4000 may be divided into independent units, or the units may be combined together for implementation. The article quality scoring device 4000 may be implemented by one of the foregoing various implementation manners, or may be implemented by a combination of two or more manners of the foregoing various implementation manners.

It is generally known by a person skilled in the art that with development of electronic information technologies such as a large-scale integrated circuit technology and a trend that software is realized through hardware. Execution of any instruction may be implemented by hardware, and may also be implemented by software. Using an implementation solution by hardware or an implementation solution by software for a function of a machine depends on non-technical factors such as a price, a speed, reliability, a storage capacity, and a change period. Therefore, for a person of ordinary skill in the field of electronic information technologies, a manner of describing a technical solution more directly and clearly is describing each operation in this solution. If an operation to be executed is known, a person skilled in the art may directly design an expected product based on a consideration of the non-technical factors.

The present invention may be a system, a method, and/or a computer program product. The computer program product may include a computer readable storage medium carrying a computer readable program instruction used for a processor to implement various aspects of the present invention.

The computer readable storage medium may be a physical device that can maintain and store an instruction used by an instruction execution device. The computer readable storage medium may be, for example, but not limited to an electrical storage device, a magnetic storage device, an optical storage device, an electromagnetic storage device, a semiconductor storage device, or any proper combination of the above. More specific examples (a nonexclusive list) of the computer readable storage medium include: a portable computer disk, a hard disk, a RAM, a ROM, an erasable programmable ROM (EPROM or a flash memory), a static RAM (SRAM), a portable compact disc ROM (CD-ROM), a digital versatile disk (DVD), a memory stick, a soft disk, a mechanical encoding device, such as a punched card storing an instruction or a protruding structure in a groove, and any proper combination of the above. The computer readable storage medium used herein is not explained as a transient signal, such as a radio wave or another electromagnetic wave propagated freely, an electromagnetic wave propagated through a waveguide or other transmission media (for example, a light pulse through a fiber optic cable), or an electrical signal transmitted through a wire.

The computer readable program instruction described herein may be downloaded from the computer readable storage medium to various computing/processing devices, or may be downloaded to an external computer or an external storage device by using a network such as the Internet, a LAN a WAN, and/or a wireless network. The network may include a copper transmission cable, optical transmission, wireless transmission, a router, a firewall, a switch, a gateway computer, and/or an edge server. A network adapter card or a network interface in each computing/processing device receives the computer readable program instruction from the network and forwards the computer readable program instruction, so as to be stored in the computer readable storage medium in each computing/processing device.

A computer program instruction for executing the operations of the present invention may be an assembly instruction, an instruction set architecture (ISA) instruction, a machine instruction, a machine related instruction, microcode, a firmware instruction, state setting data, or a source code or a target code programmed by using any combination of one or more programming languages, where the programming languages include an object-oriented programming language, such as Smalltalk or C++, and a conventional procedure programming language, such as the "C" language or a similar programming language. The computer readable program instruction may be entirely executed on a user computer, partly executed on the user computer, executed as an independent software package, partly executed on the user computer and partly executed on a remote computer, or entirely executed on the remote computer or a server. In a case in which a remote computer is related, the remote computer may be connected to the user computer by using any type of network including a LAN or a WAN, or may be connected to an external computer (for example, being connected by using the Internet by using an Internet service provider). In some embodiments, an electronic circuit may be customized by using status information of the computer readable program instruction, for example, a programmable logic circuit, a field programmable gate array (FPGA), or a programmable logic array (PLA). The electronic circuit may execute the computer readable program instruction, so as to implement various aspects of the present invention.

Herein, various aspects of the present invention are described with reference to the flowcharts and/or the block diagrams of the method, the apparatus (the system), and the computer program product according to the embodiments of the present invention. It should be understood that each box in the flowcharts and/or the block diagrams and combinations of the boxes in the flowcharts and/or the block diagrams may be implemented by the computer readable program instruction.

These computer readable program instructions may be provided to a processor of a general-purpose computer, a dedicated computer, or another programmable data processing apparatus, to generate a machine, so that when the instructions executed by a computer or a processor of another programmable data processing apparatus, an apparatus for implementing a specific function in one or more boxes in the flowcharts and/or the block diagrams is generated. These computer readable program instructions may also be stored in the computer readable storage medium. These instructions enable the computer, the programmable data processing apparatus, and/or another device to work in a specific manner, so that a computer readable medium storing the instructions includes a product including instructions implementing various aspects of specific functions/actions in one or more boxes in the flowcharts and/or the block diagrams.

The computer readable program instruction may also be loaded to the computer, another programmable data processing apparatus, or another device, so that a series of operations and steps are performed on the computer, the another programmable data processing apparatus or the another device, thereby generating a computer-implemented process. Therefore, the instructions executed on the computer, the another programmable data processing apparatus, or the another device implement specific function in one or more boxes in the flowcharts and/or the block diagrams.

The flowcharts and the block diagrams in the accompanying drawings show an architecture, functions, and operations that may be implemented of the system, the method, and the computer program product according to multiple embodiments of the present invention. In this point, each box in the flowcharts or the block diagrams may represent a module, a program segment, or a part of an instruction, where the module, the program segment, or the part of the instruction includes one or more executable instructions for implementing a specific logic function. In some alternative implementations, functions marked in the boxes may also occur in an order different from the order marked in the accompany drawings. For example, two successive boxes actually may be substantially executed concurrently, and sometimes may also be executed in a reverse order; this depends on related functions. It also should be noted that each box in the flowcharts and/or the block diagrams and a combination of the boxes in the flowcharts and/or the block diagrams may be implemented by using a dedicated hardware-based system for executing a specific function or action, or may be implemented by using a combination of dedicated hardware and a computer instruction. It is generally known by a person skilled in the art that implementing by means of hardware, implementing by means of software, or implementing by combining software and hardware are equivalent.

Various embodiments of the present invention are described above. The description above is only for illustration but is not exhaustive, and is not limited to the various disclosed embodiments either. Many modifications and variations are obvious to a person of ordinary skill in the art without departing from the scope and the spirit of the various described embodiments. Selections of terms used in the text are aimed at optimally explaining principles of the various embodiments, actual application, or technical improvements to the market; or are aimed at enabling another person of ordinary skill in the art to understand the various embodiments disclosed herein. The scope of the present invention is limited by the appended claims.

What is claimed is:

1. An article quality scoring method, comprising:
   obtaining browsing behavior information of a user when the user browses a target article, wherein the browsing behavior information comprises a reading time index, a reading length index, and a reading experience index of browsing of the target article by the user; and
   obtaining a browsing behavior score of the user for the target article according to the browsing behavior information and a corresponding browsing behavior coefficient, wherein the browsing behavior coefficient comprises a reading time coefficient corresponding to the reading time index, a reading length coefficient corresponding to the reading length index, and a reading experience coefficient corresponding to the reading experience index, and the browsing behavior score of the target article includes a sum of a product of the reading time index and the reading time coefficient, a product of the reading length index and the reading length coefficient, and a product of the reading experience index and the reading experience coefficient; and
   obtaining an article quality score of the target article based on an average value of the obtained browsing behavior scores of a plurality of users that have previously browsed the target article.

2. The method according to claim 1, wherein the reading time index is a reading time of a unit article length when the user browses the target article.

3. The method according to claim 1, wherein the reading length index is a ratio of an actual reading length to a total length of the target article when the user browses the target article.

4. The method according to claim 1, wherein the reading experience index is a positive feedback indication or a negative feedback indication given by the user when the user browses the target article.

5. The method according to claim 1, wherein the reading time is a reading time of a fixed number of bytes of the target article.

6. The method of claim 1, wherein the article quality score of the target article reflects actual experiences of the multiple users when the multiple users browse the target article.

7. A non-transitory computer-readable storage medium storing instructions that, when executed by a processor of a computer system, cause the computer system to perform operations comprising:
    obtaining browsing behavior information of a user when the user browses a target article, wherein the browsing behavior information comprises a reading time index, a reading length index, and a reading experience index of browsing of the target article by the user; and
    obtaining a browsing behavior score of the user for the target article according to the browsing behavior information and a corresponding browsing behavior coefficient, wherein the browsing behavior coefficient comprises a reading time coefficient corresponding to the reading time index, a reading length coefficient corresponding to the reading length index, and a reading experience coefficient corresponding to the reading experience index, and the browsing behavior score of the target article includes a sum of a product of the reading time index and the reading time coefficient, a product of the reading length index and the reading length coefficient, and a product of the reading experience index and the reading experience coefficient; and
    obtaining an article quality score of the target article based on an average value of the obtained browsing behavior scores of a plurality of users that have previously browsed the target article.

8. The non-transitory computer-readable storage medium according to claim 7, wherein the reading time index is a reading time of a unit article length when the user browses the target article.

9. The non-transitory computer-readable storage medium according to claim 7, wherein the reading length index is a ratio of an actual reading length to a total length of the target article when the user browses the target article.

10. The non-transitory computer-readable storage medium according to claim 7, wherein the reading experience index is a positive feedback indication or a negative feedback indication given by the user when the user browses the target article.

11. The non-transitory computer-readable storage medium according to claim 7, wherein the reading time is a reading time of a fixed number of bytes of the target article.

12. The non-transitory computer-readable storage medium according to claim 7, wherein the article quality score of the target article reflects actual experiences of the multiple users when the multiple users browse the target article.

13. A server, comprising:
a processor; and
a memory storing instructions that, when executed by the processor, cause the server to perform:
    obtaining browsing behavior information of a user when the user browses a target article, wherein the browsing behavior information comprises a reading time index, a reading length index, and a reading experience index of browsing of the target article by the user; and
    obtaining a browsing behavior score of the user for the target article according to the browsing behavior information and a corresponding browsing behavior coefficient, wherein the browsing behavior coefficient comprises a reading time coefficient corresponding to the reading time index, a reading length coefficient corresponding to the reading length index, and a reading experience coefficient corresponding to the reading experience index, and the browsing behavior score of the target article includes a sum of a product of the reading time index and the reading time coefficient, a product of the reading length index and the reading length coefficient, and a product of the reading experience index and the reading experience coefficient; and
    obtaining an article quality score of the target article based on an average value of the obtained browsing behavior scores of a plurality of users that have previously browsed the target article.

14. The server according to claim 13, wherein the reading time index is a reading time of a unit article length when the user browses the target article.

15. The server according to claim 13, wherein the reading length index is a ratio of an actual reading length to a total length of the target article when the user browses the target article.

16. The server according to claim 13, wherein the reading experience index is a positive feedback indication or a negative feedback indication given by the user when the user browses the target article.

17. The server according to claim 13, wherein the reading time is a reading time of a fixed number of bytes of the target article.

18. The server according to claim 13, wherein the article quality score of the target article reflects actual experiences of the multiple users when the multiple users browse the target article.

* * * * *